United States Patent
Noguchi et al.

(10) Patent No.: US 7,433,440 B2
(45) Date of Patent: Oct. 7, 2008

(54) JITTER-DETECTING CIRCUIT, RECEIVING CIRCUIT INCLUDING THE JITTER-DETECTING CIRCUIT, AND COMMUNICATION SYSTEM

(75) Inventors: Hidemi Noguchi, Tokyo (JP); Chiharu Kogiso, Tokyo (JP)

(73) Assignee: NEC Corporation (JP)

( * ) Notice: Subject to any disclaimer, the term of this patent is extended or adjusted under 35 U.S.C. 154(b) by 756 days.

(21) Appl. No.: 10/373,928

(22) Filed: Feb. 25, 2003

(65) Prior Publication Data

US 2003/0165207 A1 Sep. 4, 2003

(30) Foreign Application Priority Data

Mar. 1, 2002 (JP) ............... 2002/055136

(51) Int. Cl.
  H04L 7/04 (2006.01)
  H04L 25/00 (2006.01)
(52) U.S. Cl. ...................... 375/371; 375/362
(58) Field of Classification Search ........... 375/371, 375/354, 316, 295, 355, 362, 373–376; 370/516
  See application file for complete search history.

(56) References Cited

U.S. PATENT DOCUMENTS

| | | | |
|---|---|---|---|
| 4,987,298 A * | 1/1991 | Inagaki | 250/214 AG |
| 5,473,639 A * | 12/1995 | Lee et al. | 375/376 |
| 6,100,724 A * | 8/2000 | Yoshimura et al. | 327/100 |
| 6,271,945 B1 * | 8/2001 | Terahara | 398/26 |
| 6,411,144 B1 * | 6/2002 | Matsuno | 327/157 |
| 2002/0044325 A1 * | 4/2002 | Noguti | 359/189 |
| 2002/0159672 A1 * | 10/2002 | Fells et al. | 385/13 |

FOREIGN PATENT DOCUMENTS

| | | |
|---|---|---|
| JP | H3-108832 | 5/1991 |
| JP | H5-225707 | 9/1993 |

* cited by examiner

Primary Examiner—Cheih M. Fan
Assistant Examiner—Jason M. Perilla
(74) Attorney, Agent, or Firm—Muirhead & Saturnelli, LLC (57) ABSTRACT

To provide a method for making a receiving-sensitivity control parameter for deciding the receiving sensitivity of an optical receiving circuit automatically follow the optimum position by using the jitter value of a binary-equalizing-data signal obtained by binary-converting an input signal as a parameter showing the quality of the input signal. A binary-equalizing-data signal output from a limiter amplifier and a clock extracted by a clock-extracting circuit are input to a jitter-detecting circuit. The jitter-detecting circuit outputs a voltage corresponding to the jitter value of the binary-equalizing-data signal. A control circuit receives an output of the jitter-detecting circuit and performs an arithmetic processing by using a DSP or the like, and controls the identification voltage of the limiter amplifier so that the jitter value of the binary-equalizing-data signal (output of jitter-detecting circuit) is minimized.

17 Claims, 13 Drawing Sheets

PRIOR ART

JITTER-DETECTING CIRCUIT, RECEIVING CIRCUIT INCLUDING THE JITTER-DETECTING CIRCUIT, AND COMMUNICATION SYSTEM

BACKGROUND OF THE INVENTION

1. Field of the Invention

The present invention relates to a jitter-detecting circuit, a receiving circuit including the jitter-detecting circuit, and a communication system. In particular, it relates to a jitter-detecting circuit for optimization of receiving sensitivity, a receiving circuit including the jitter-detecting circuit, and a communication system.

2. Description of the Prior Art

In general, a receiving-sensitivity control parameter for deciding the receiving sensitivity of an optical receiving circuit has the optimum value depending on the optical reception level. Receiving-sensitivity control parameters include parameters for enhancing of receiving sensitivity of the receiving circuit such as an input-signal identification level (identification voltage), identification phase, multiplication factor of an avalanche photodiode (APD), and frequency characteristic of an amplifying circuit such as a limiter amplifier, and parameters of means for compensating the waveform deterioration of a signal passing through a transmission line (optimization of optical input waveform input to receiving circuit) such as parameters for a dispersion compensator and preemphasis circuit at a transmission end.

Figure 13:
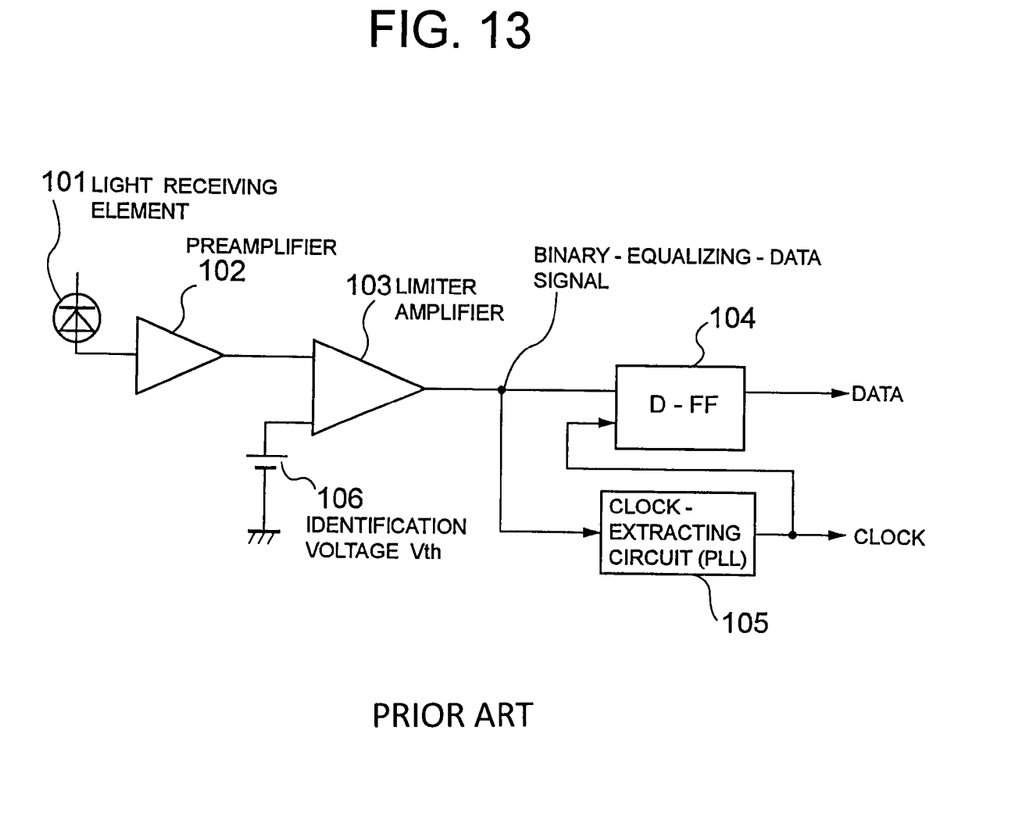
FIG. 13 is a block diagram showing a configuration of a conventional optical receiving circuit.

These receiving-sensitivity control parameters have been used so far by adjusting them so that they become optimum at a certain point for convenience sake. FIG. 13 is a block diagram showing a configuration of a conventional optical receiving circuit. In FIG. 13, the conventional optical receiving circuit is constituted by a light receiving element 101, preamplifier 102, limiter amplifier 103, D-FF (D flip-flop) 104, and clock-extracting circuit (PLL circuit) 105.

An input signal supplied from the light receiving element 101 is amplified by the preamplifier 102 and input to the limiter amplifier 103. Then, the level of the input signal is compared with a constant identification voltage Vth 106 by the limiter amplifier 103 and "0" or "1" is determined. Then, a clock is extracted from a binary-equalizing-data signal which is the determination result by the clock-extracting circuit 105. Then, the binary-equalizing-data signal and clock are input to the D-FF 104 and output data is obtained.

Thus, even if the identification voltage Vth 106 is constant, it is sufficient for practical use because an S/N (signal-to-noise ratio) deterioration factor substantially consists of only the loss of a transmission line.

However, in the case of recent high-speed long-distance transmission including an optical amplifier and WDM (wavelength division multiplexing transmission), the tolerance to a shift of a receiving-sensitivity control parameter from the optimum position is lowered because there are a more number of factors causing the S/N of an optical input signal to deteriorate compared with a conventional optical transmission system, such as ASE (amplified spontaneous emission) noises generated by an optical-fiber amplifier, waveform deterioration caused by dispersion or nonlinear effect of an optical fiber, and crosstalk from an adjacent channel in wavelength multiplex transmission.

In the case of the above high-speed long-distance transmission system, the above method of fixedly providing receiving-sensitivity control parameters cannot ensure a required receiving sensitivity, and therefore, it has a disadvantage such as limited transmission distance. Moreover, a bent (floor) of an error-rate characteristic occurs because of shift of receiving-sensitivity control parameters from the optimum positions. The floor may narrow the dynamic range, and in the worst case, provide no error-free range.

Figure 14:
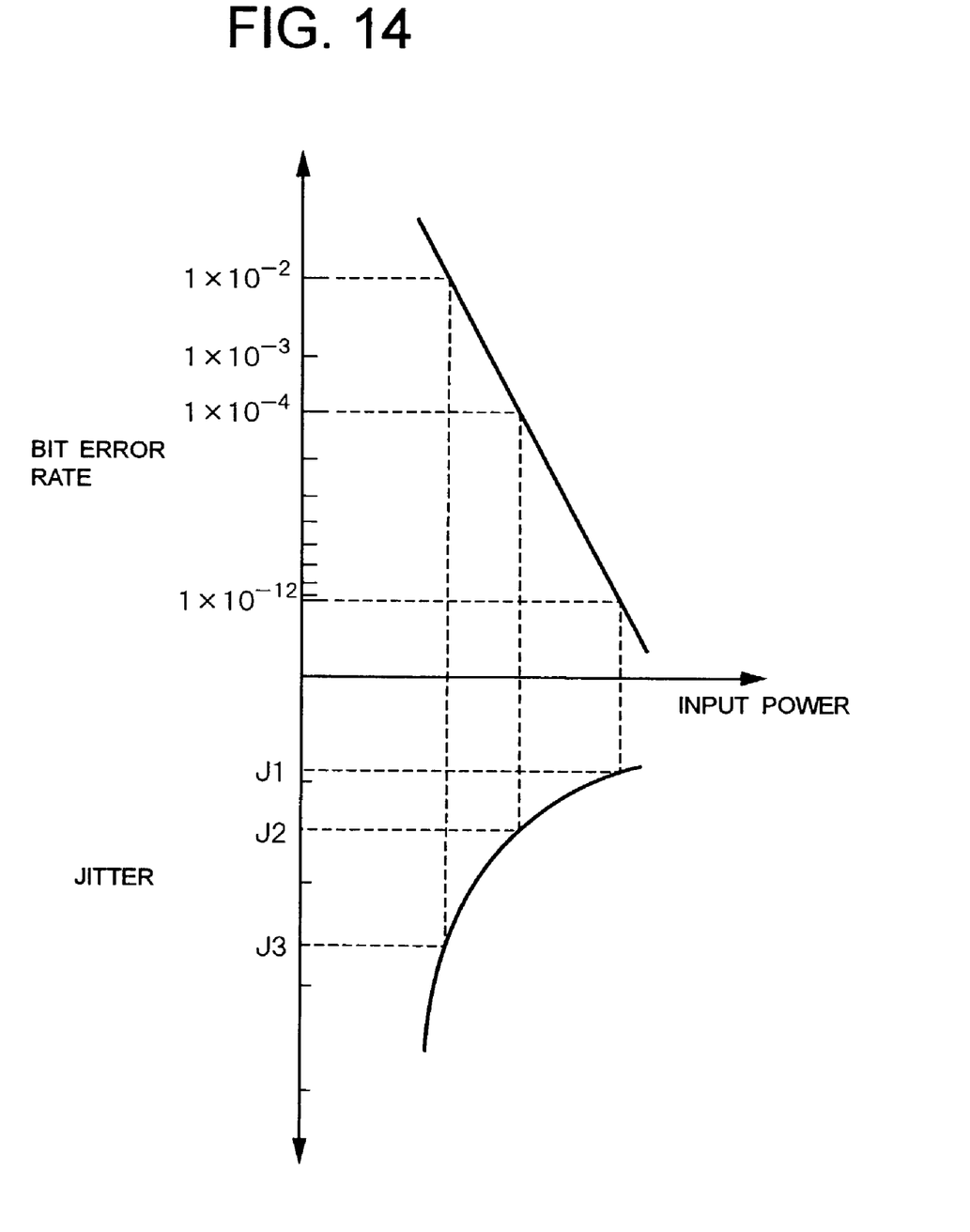
FIG. 14 is an illustration showing a correlation between input power, bit error rate, and jitter.

There is the jitter of a binary-equalizing-data signal obtained by converting an input signal into a binary notation as a factor relating to a receiving sensitivity. The correlation between bit error rate (BER) showing a receiving sensitivity and jitter is briefly described below by referring to FIG. 14. FIG. 14 is an illustration showing a correlation between input power, bit error rate, and jitter. In FIG. 14, the horizontal axis shows input power, upward vertical axis shows bit error rate, and downward vertical axis shows jitter value. As shown in FIG. 14, as the input power decreases, the bit error rate increases and the jitter value also increases. Therefore, when the bit error rate increases, the jitter value increases. However, as the input power increases, the bit error rate decreases and the jitter value also decreases. Therefore, when the bit error rate decreases, the jitter value also decreases. Thus, because a bit error rate uniquely corresponds to a jitter value, it is possible to measure a receiving sensitivity by measuring a jitter value.

SUMMARY OF THE INVENTION

It is an object of the present invention to provide a jitter-detecting circuit capable of making a receiving-sensitivity control parameter for deciding the receiving sensitivity of an optical receiving circuit automatically follow the optimum position by using the jitter value of a binary-equalizing-data signal obtained by binary-converting an input signal as a parameter showing the input-signal quality, a receiving circuit including the jitter-detecting circuit, and a communication system.

To solve the above problems, a jitter-detecting circuit of the present invention is a jitter-detecting circuit for detecting jitter from a binary-equalizing-data signal including a synchronization clock, which comprises phase-delaying means for delaying the phase of the clock by a predetermined value, flip-flop means for sampling the clock delayed by the phase-delaying means at the leading edge or trailing edge of the binary-equalizing-data signal, and average-value-detecting means for detecting and outputting the average value of outputs of the flip-flop means.

Moreover, a receiving circuit of the present invention comprises control means for controlling any one or a plurality of receiving-sensitivity control parameters in accordance with a jitter value detected from a binary-equalizing-data signal obtained by converting an input signal into binary data.

Furthermore, a communication system of the present invention comprises a receiver including the above receiving circuit, a transmitter opposite to the receiver, and a transmission line for connecting the receiver with the transmitter.

According to the present invention, it is possible to make a receiving-sensitivity control parameter for deciding the receiving sensitivity of an optical receiving circuit automatically follow the optimum position by using the jitter value of a binary-equalizing-data signal obtained by binary-converting an input signal.

DETAILED DESCRIPTION OF THE PREFERRED EMBODIMENTS

Figure 1:
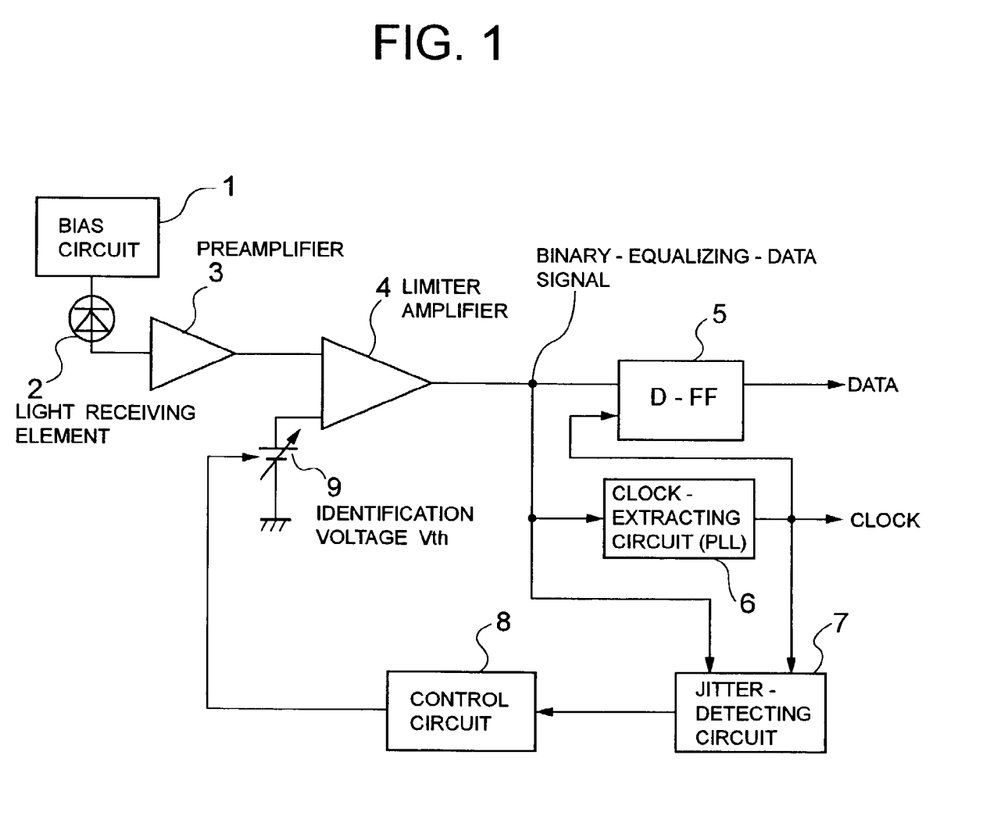
FIG. 1 is a block diagram showing a configuration of an optical receiving circuit according to a first embodiment of the present invention.

Embodiments of the present invention are described below by referring to the accompanying drawings. First, a first embodiment of the present invention is described. FIG. 1 is a block diagram showing a configuration of an optical receiving circuit according to the first embodiment of the present invention. In FIG. 1, the optical receiving circuit according to the first embodiment is constituted by including a bias circuit 1, light receiving element 2, a preamplifier 3, a limiter amplifier 4, a D-FF (D flip-flop) 5, a clock-extracting circuit (PLL circuit) 6, a jitter-detecting circuit 7, and a control circuit 8.

The bias circuit 1 supplies a predetermined bias voltage to the light receiving element 2. The light receiving element 2 converts a received optical signal into an electrical signal. The preamplifier 3 amplifies the electrical signal supplied from the light receiving element 2. The limiter amplifier 4 binary-identifies the electrical signal supplied from the preamplifier 3 by using an identification voltage Vth 9. The D-FF 5 et al. will be described later.

In the optical receiving circuit which identifies and regenerates a data signal by extracting a clock from the data signal that is an electrical signal converted at the light receiving element 2, the jitter-detecting circuit 7 receives a binary-equalizing-data signal identified to "1" or "0" by the limiter amplifier 4 and a clock supplied from the clock-extracting circuit 6 and outputs a voltage corresponding to the jitter of the binary-equalizing-data signal.

The control circuit 8 receives the output from the jitter-detecting circuit 7, arithmetic-processes the output by using a DSP (Digital Signal Processor) or the like, and controls the identification voltage Vth 9 of the limiter amplifier 4 so that the jitter value of the binary-equalizing-data signal (output of the jitter-detecting circuit 7 in the case of the first embodiment) is minimized.

Then, operations of the optical receiving circuit are described. A data signal that is an electrical signal converted by the light receiving element 2 and preamplifier 3 is converted into a binary-equalizing-data signal of "1" or "0" in comparison with the identification voltage Vth 9 input to another terminal of the limiter amplifier 4. The D-FF 5 regenerates a data signal including no jitter by reading the binary-equalizing-data signal output from the limiter amplifier 4 at the timing of a clock extracted from the binary-equalizing-data signal by the clock-extracting circuit 6.

Though amplitude-directional noises are removed from the binary-equalizing-data signal by the limiter amplifier 4, noises superimposed on the rise and fall portions of the binary-equalizing-data signal appear as jitter.

Therefore, the jitter value (time-base-directional width) of the binary-equalizing-data signal obtained by converting the input signal into a binary notation is measured to control a receiving-sensitivity control parameter (identification position, multiplication factor of the light receiving element or the like) for deciding the receiving sensitivity of the optical receiving circuit so that the jitter value is minimized.

The binary-equalizing-data signal output from the limiter amplifier 4 and the clock extracted by the clock-extracting circuit 6 are input to the jitter-detecting circuit 7 and a voltage corresponding to the jitter value of the binary-equalizing-data signal is output from the jitter-detecting circuit 7. The control circuit 8 receives the output from the jitter-detecting circuit 7 to perform arithmetic processing by using a DSP or the like and control the identification voltage Vth 9 of the limiter amplifier 4 so that the jitter value of the binary-equalizing-data signal (output of jitter-detecting circuit 7 in the case of the first embodiment) is minimized.

Figure 2A:
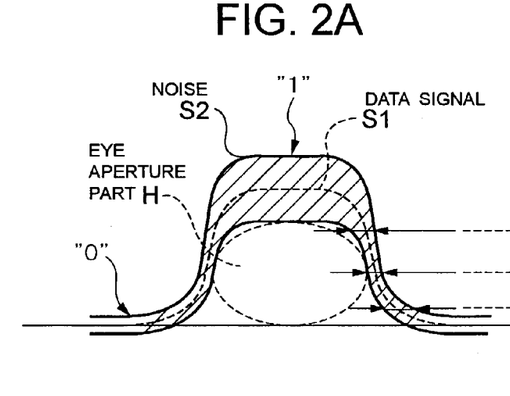
FIGS. 2A and 2B are illustrations showing the relation between the noise of a data signal input to a limiter amplifier 4 and the jitter value of a binary-equalizing-data signal identified by the identification voltage Vth.
Figure 2B:
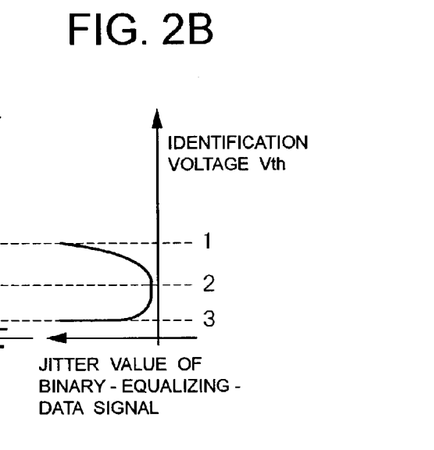

Then, noises superimposed on a data signal input to the limiter amplifier 4 are described below. FIGS. 2A and 2B are illustrations showing the relation between a noise of a data signal input to the limiter amplifier 4 and identification voltage Vth. FIG. 2A is an illustration showing the relation between a data signal S1 input to the limiter amplifier 4 and a noise S2 superimposed on the data signal S1. In FIG. 2A, the horizontal axis denotes time (sec) and the vertical axis denotes level (V). FIG. 2B is an illustration showing the relation between the jitter value of a binary-equalizing-data signal obtained by binarizing the signal shown in FIG. 2A with the identification voltage Vth and the identification voltage Vth, in which the horizontal axis denotes jitter value and the vertical axis denotes identification voltage Vth (V).

In FIG. 2A, the portion in which the level of the data signal S1 shown by a broken line is high shows data "1" and the portion in which the level is low shows data "0". The noise S2 is a noise superimposed on the data signal S1 and has the amplitude of the hatched portion.

As shown in FIG. 2A, in the case of the noise S2 superimposed on the data signal S1, the rise and fall of the data nearby "0" trails the skirt because a noise superimposed on "1" is larger than a noise superimposed on "0" due to ASE noise in a system including an optical amplifier, etc. and the rise time and fall time of the data are limited. The noise S2 superimposed on the data signal S1 input to the limiter amplifier 4 appears as jitter at the rise and fall portions of the binary-equalizing-data signal which is the output of limiter amplifier 4 and the jitter value is minimized when identifying the data signal S1 nearby the middle of an eye aperture part H. FIG. 2B shows that the jitter value is minimized when the identification voltage Vth is equal to "2"

Thus, because it is optimum to set the identification voltage Vth 9 for identifying "1" or "0" of the data signal S1 on which the noise S2 is superimposed on the middle of the eye aperture part, it is allowed to control the identification voltage Vth 9 so that an output of the jitter-detecting circuit 7 is minimized.

Figure 3:
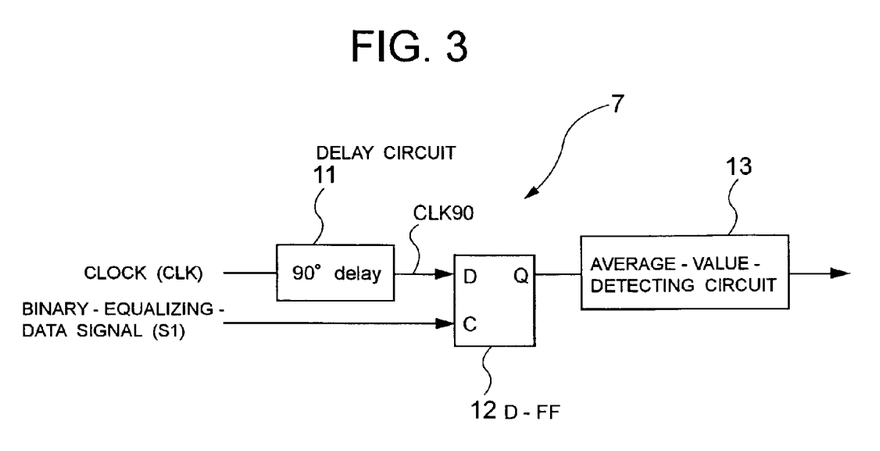
FIG. 3 is a block diagram showing a configuration of a jitter-detecting circuit 7.

Then, a configuration of the jitter-detecting circuit 7 is described below. FIG. 3 is a block diagram showing the configuration of the jitter-detecting circuit 7. In FIG. 3, the jitter-detecting circuit 7 is constituted by including a delay circuit 11, D-FF 12, and average-value-detecting circuit 13. The delay circuit 11 delays a clock supplied from the clock-extracting circuit 6 by 90°. The clock delayed by 90° is displayed as "CLK90" hereafter. The D-FF 12 reads the output (CLK 90) of the delay circuit 11 at the change point of the binary-equalizing-data signal. The average-value-detecting circuit 13 detects the average value of outputs of the D-FF 12.

Figure 4A:
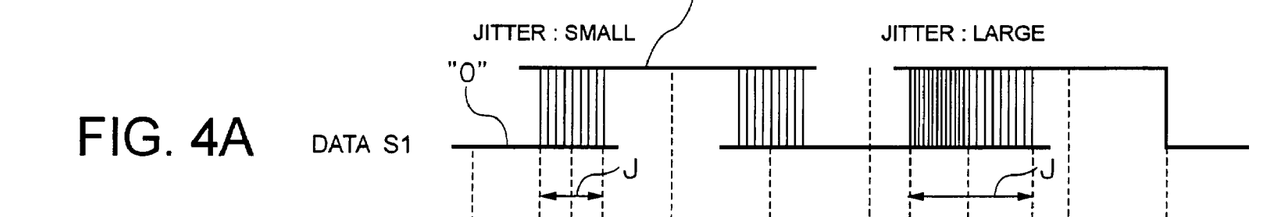
FIGS. 4A to 4D are timing charts showing operations of the jitter-detecting circuit 7.
Figures 4B, 4C:
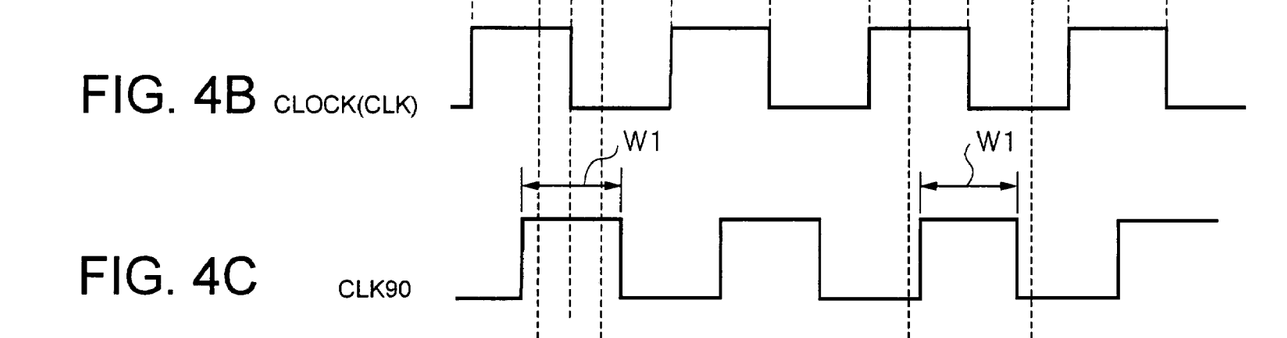
Figure 4D:
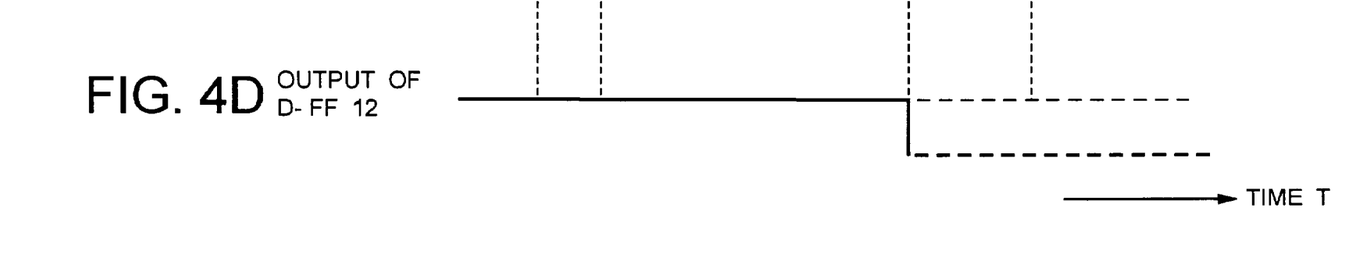
Figure 5:
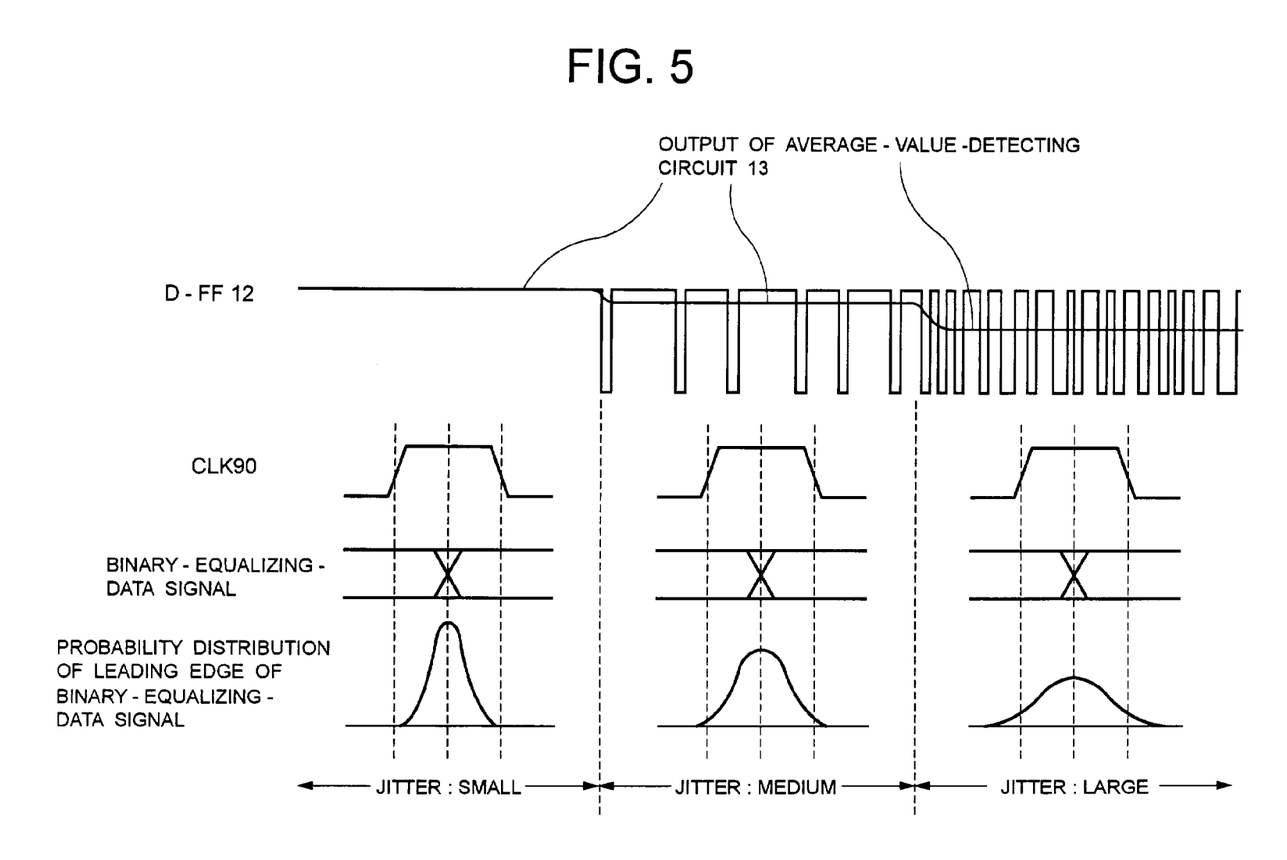
FIG. 5 is a waveform diagram showing the operations of the jitter-detecting circuit 7.

Then, operations of the jitter-detecting circuit 7 are described below. FIGS. 4A to 4D are timing charts showing operations of the jitter-detecting circuit 7, FIG. 5 is a waveform diagram showing the operations. In FIGS. 4A to 4D, the binary-equalizing-data signal S1 is shown in FIG. 4A, the clock (CLK) extracted by the clock-extracting circuit 6 is shown in FIG. 4B, the CLK 90 is shown in FIG. 4C, and an output of the D-FF 12 is shown in FIG. 4D.

FIG. 4A shows a state in which noises superimposed on the rise and fall portions of the binary-equalizing-data signal S1 appear as jitters. FIG. 4B shows that the binary-equalizing-data signal S1 rises or falls when the clock CLK falls. That is, FIGS. 4A and 4B show the general phase relation between a clock input to a D-FF and a binary-equalizing-data signal. FIG. 4C shows that the clock 90 is a clock whose phase is delayed from that of the clock CLK by 90°. FIG. 4D shows the output of the D-FF 12 as described above.

In this case, a noticeable point is the fact that points of rise and fall times (on time base T) of the binary-equalizing-data signal S1 come to the middle (on time base T) of the level "1" of the CLK 90 because of the 90° delay in phase of CLK 90 relative to clock CLK.

In FIG. 4A, a case is considered in which the width of the jitter of the binary-equalizing-data signal S1 is comparatively small (jitter: small). In this case, it is assumed that the width of the jitter is equal to or less than the pulse width WI of the CLK 90. In this case, an output of the D-FF 12 is kept constant at the level "1" even if sampling the CLK 90 at any position of the jitter of the binary-equalizing-data signal Si in the D-FF 12.

However, when a case is considered in which the width of the jitter of the binary-equalizing-data signal S1 is relatively large (jitter: large) (refer to FIG. 4A), an output of the D-FF 12 becomes the level "0" when reading the CLK 90 at a portion exceeding the pulse width W1 because the width of the jitter is larger than the pulse width WI of the CLK 90. That is, as the jitter width increases, the probability that an output of the D-FF 12 becomes "0" rises. Therefore, by monitoring an output of the D-FF 12, it is possible to detect the jitter value of the binary-equalizing-data signal S1.

FIG. 5 is an illustration showing the relation between probability distribution of the leading edge of the binary-equalizing-data signal S1 and output of the D-FF 12 in the jitter-detection circuit 7. That is, in FIG. 5, when jitter is small and the probability distribution of the leading edge of the binary-equalizing-data signal S1 is equal to or less than the width of the level "1" of the CLK 90, an output of the D-FF 12 is constantly kept at "1" and an output of the average-value-detecting circuit 13 is also constantly kept at the level "1".

However, when jitter is medium or large, the probability distribution of the leading edge of the binary-equalizing-data signal S1 protrudes from the width of the level "1" of the CLK 90. Then, an output of the D-FF 12 becomes the level "0" for the protruded portion. Thus, as the width of jitter increases, the probability that an output of the D-FF 12 becomes "0" rises. Therefore, the average value of outputs of the D-FF 12 decreases and an output of the average-value-detecting circuit 13 lowers. That is, an output of the average-value-detecting circuit 13 corresponds to the jitter value.

In the case of the first embodiment, though the phase of the CLK 90 is delayed from that of the clock CLK by 90°, a phase delay is not restricted to 90°. This is because an opportunity capable of improving the sensitivity of jitter detection rises by setting the phase delay of the CLK 90 to less than 90° or more than 90°. Moreover, by changing the duty of the CLK 90, it is possible to adjust the sensitivity of jitter detection.

Figure 6:
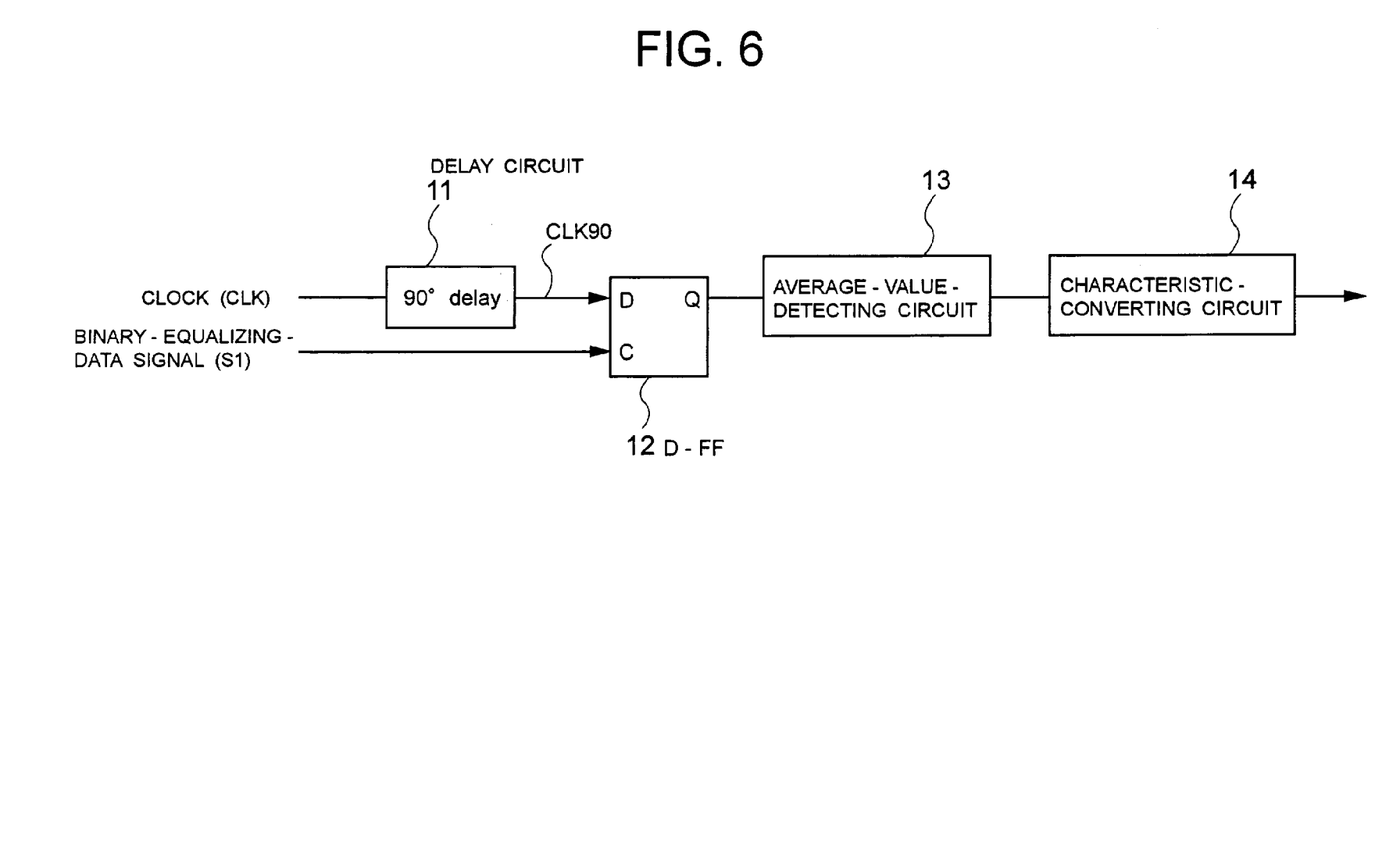
FIG. 6 is a block diagram of a modification of the jitter-detecting circuit 7.

FIG. 6 is a block diagram of a modification of the jitter-detecting circuit 7. In FIG. 6, a component same as that in FIG. 3 is provided with the same number and its description is omitted. In FIG. 6, the modification of the jitter-detecting circuit 7 is obtained by connecting a characteristic-converting circuit 14 to the rear stage of the average-value-detecting circuit 13. According to the above configuration, it is allowed to change the relation between jitter value and output of the average-value-detecting circuit 13 so that it can be easily controlled by the control circuit 8. For example, it is considered to change the relation to a linear relation by using a nonlinear-to-linear converting circuit as the circuit 14.

Figure 7:
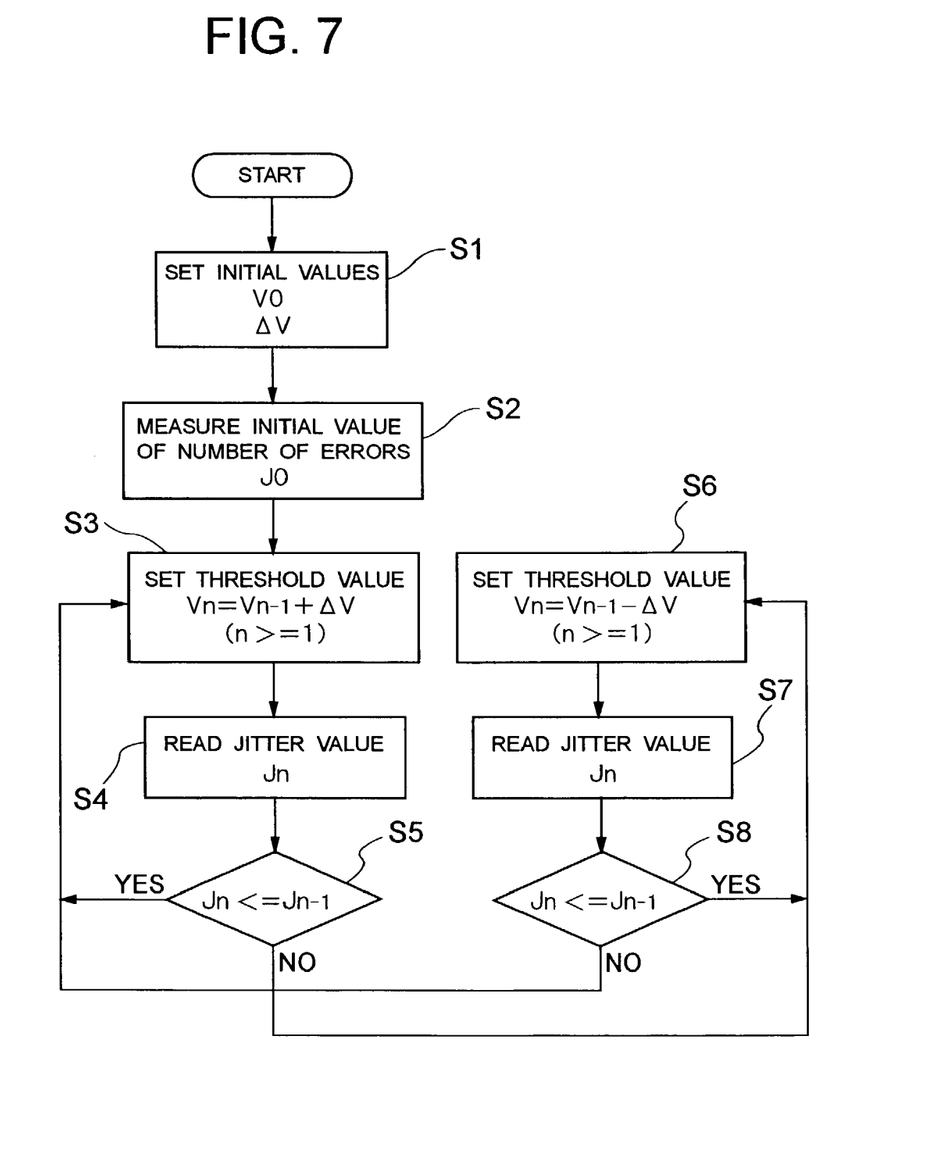
FIG. 7 is an illustration showing a control algorithm of a control circuit 8.
Figure 8:
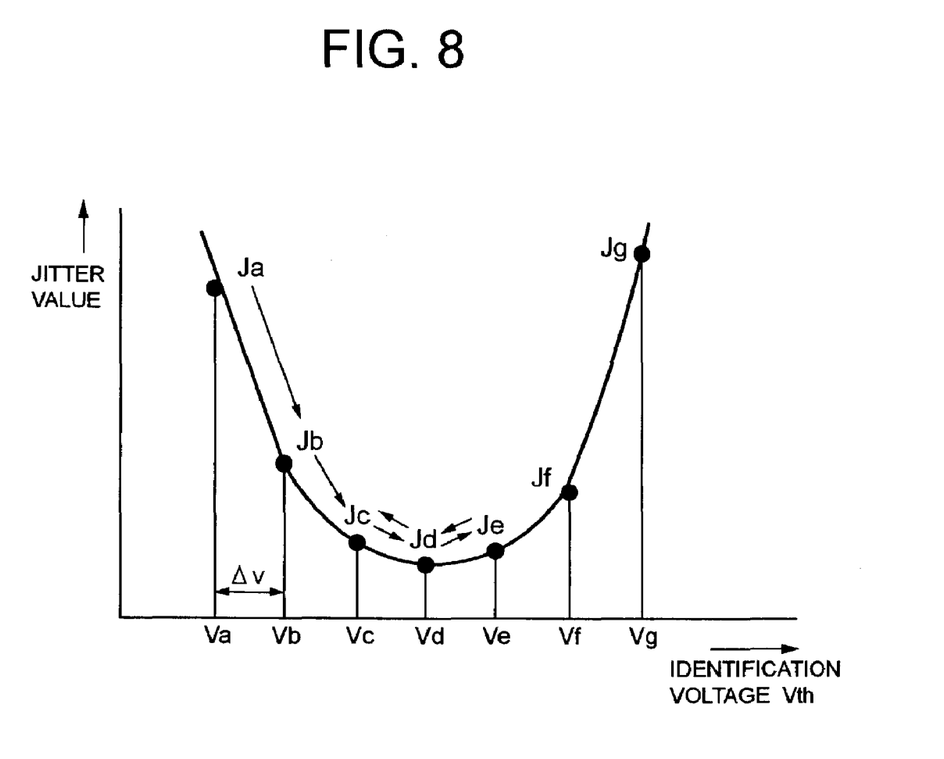
FIG. 8 is an illustration for explaining operations of the control algorithm in FIG. 7.

Then, operations of the control circuit 8 are described below by referring to FIGS. 7 and 8. FIG. 7 is an illustration showing a control algorithm of the control circuit 8 and FIG. 8 is an illustration for explaining the operation of the control algorithm. The control circuit 8 controls the identification voltage Vth 9 of the limiter amplifier 4 so that the jitter value of the binary-equalizing-data signal S1 (output of the jitter-detecting circuit 7 in the case of the first embodiment) is minimized. As one of control methods, it is allowed to control the identification voltage Vth 9 in accordance with the following algorithm by using a DSP or the like.

It is assumed that the jitter value of the binary-equalizing-data signal S1 in the case where the identification voltage Vth 9 is a voltage Vn (n=0, 1, 2, . . . ) corresponds to an output (hereafter referred to as jitter value) Jn (n=0, 1, 2, . . . ) of the jitter-detecting circuit 7.

The initial value V0 (Va) of the identification voltage Vth and the increase ΔV every step are decided in initial-value setting (S1 in FIG. 7). Then, the initial value J0 (Ja) {J0 (Ja) in FIG. 8} of the jitter value at the identification voltage V0 (Va) is measured (S2 in FIG. 7). Then, the identification voltage V0 (Va) is increased by ΔV (S3 in FIG. 7, V1 (Vb) in FIG. 8) to measure the jitter value J1 (Jb) at the identification voltage V1 (Vb) (S4 in FIG. 7). As a result of comparing J0 (Ja) with J1 (Jb), it is found that the jitter value J1 (Jb) is smaller than the jitter value J0 (Ja) (S5 in FIG. 7, YES). Therefore, the jitter value J2 (Jc) at the identification voltage V2 (Vc) is measured (S4 in FIG. 7) by setting V2(Vc)=V1+ΔV (S3 in FIG. 7). As a result of comparing J1 (Jb) with J2 (Jc), it is found that the jitter value J2 (Jc) is smaller than the jitter value J1 (Jb) (S5 in FIG. 7, YES). Therefore, the jitter value J3 (Jd) at the identification voltage V3 (Vd) is measured (S4 in FIG. 7) by setting V3(Vd)=V2+ΔV (S3 in FIG. 7).

As a result of comparing J2 (Jc) with J3 (Jd), it is found that the jitter value J3 (Jd) is smaller than the jitter value J2 (Jc) (S5 in FIG. 7, YES). Therefore, the jitter value J4 (Je) at the identification voltage V4 (Ve) is further measured by setting V4 (Ve)=V3+ΔV (S4 in FIG. 7). In this case, the jitter value J4 (Je) becomes larger than the jitter value J3 (Jd) (S5 in FIG. 7, NO). This represents that the value of the identification voltage Vth leaves the optimum position. In this case, right steps in the flowchart in FIG. 7 are started to reverse the direction of change of ΔV. That is, the jitter value J5 (Jd) at the identification voltage V5 (Vd) is measured (S7 in FIG. 7) by setting V5=V4(Ve)−ΔV (that is, returning to Vd) (S6 in FIG. 7) to compare the jitter value J5 (Jd) with the jitter value J4 (Je) (S8 in FIG. 7). As a result of comparing J5 (Jd) with J4 (Je), it is found that J5 (Jd) is smaller than J4 (Je) (S8 in FIG. 7, YES). Therefore, the jitter value J6 (Jc) at the identification voltage V6 (Vc) is measured (S7 in FIG. 7) by setting V6=V3 (Vd)−ΔV (that is, returning to Vc) (S6 in FIG. 7). As a result of comparing J6 (Jc) with J5 (Jd), it is found that J6 (Jc) is larger than J5 (Jd) (S8 in FIG. 7, NO). Therefore, the jitter value J7 (Jd) at the identification voltage V7 (Vd) is measured (S4 in FIG. 7) by reversing the direction of change of ΔV again, that is, starting left steps in the flowchart in FIG. 7 and setting V7(Vd)=V6(Vc)+ΔV (S3 in FIG. 7).

As a result, a cycle of Va→Vb→Vc→Vd (optimum position)→Ve→Vd (optimum position)→Vc→Vd (optimum position)→Ve→ . . . is repeated and the value of the identification voltage Vth is always controlled to the vicinity of Vd (optimum position). The initial value V0 of the identification voltage Vth may be set to a voltage Vg in FIG. 8. In this case, the control circuit 8 performs the control of decreasing the identification voltage Vth by ΔV whenever the jitter value decreases (improves), reversing the direction of change of ΔV when the number of errors increases (that is, the jitter value increases), and increasing the identification voltage Vth by ΔV. Thus, the same result is obtained even if starting with any value of the identification voltage Vth.

Figure 9:
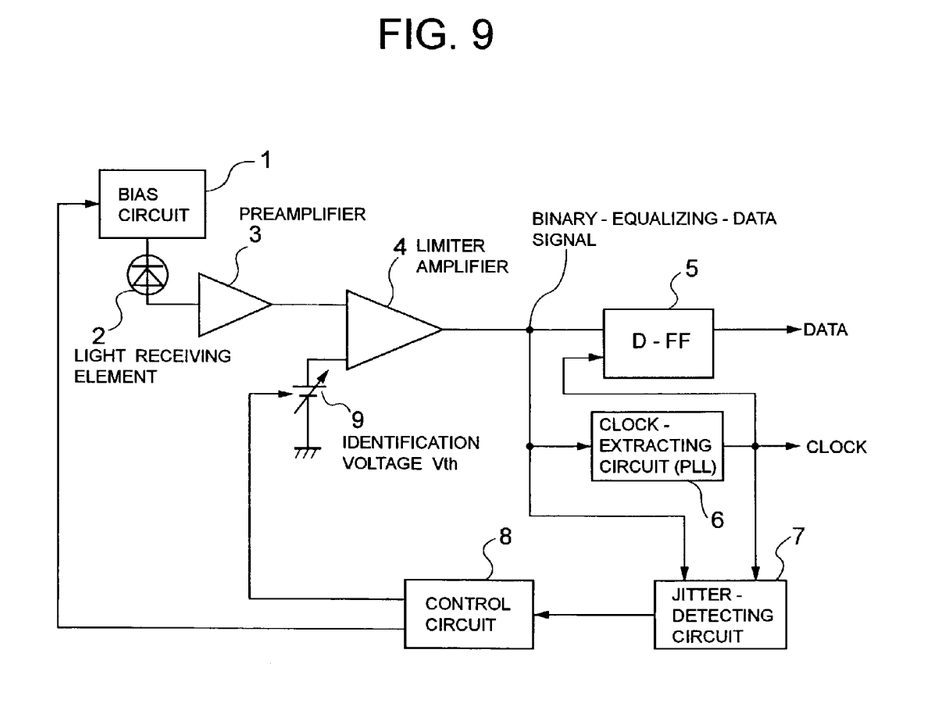
FIG. 9 is a block diagram of a second embodiment of the present invention.

Then, a second embodiment of the present invention is described below. FIG. 9 is a block diagram of the second embodiment. In FIG. 9, a component same as that in FIG. 1 is provided with the same number and its description is omitted. In FIG. 9, the configuration of the second embodiment is different from that of the first embodiment (refer to FIG. 1) in that the control circuit 8 is constituted so as to also control the bias circuit 1 together with the identification voltage Vth 9.

The second embodiment is an embodiment which controls the multiplication factor of the light receiving element 2 so as to be optimized when using a light receiving element having a multiplying function such as an APD as the element 2. A light receiving element having a multiplying function such as an APD has a multiplication factor for optimizing S/N and the multiplication factor can be controlled by changing a backward-bias voltage supplied by the bias circuit 1.

Therefore, it is possible to control the multiplication factor of the light receiving element 2 to the optimum value by controlling the backward-bias voltage through the bias circuit 1 so that the jitter value of the binary-equalizing-data signal (output of jitter-detecting circuit 7 in the case of the second embodiment) is minimized. For the second embodiment, a case is described in which the multiplication factor is controlled together with the identification voltage Vth 9. However, it is also possible to constitute an embodiment so as to control only the bias circuit 1.

Figure 10:
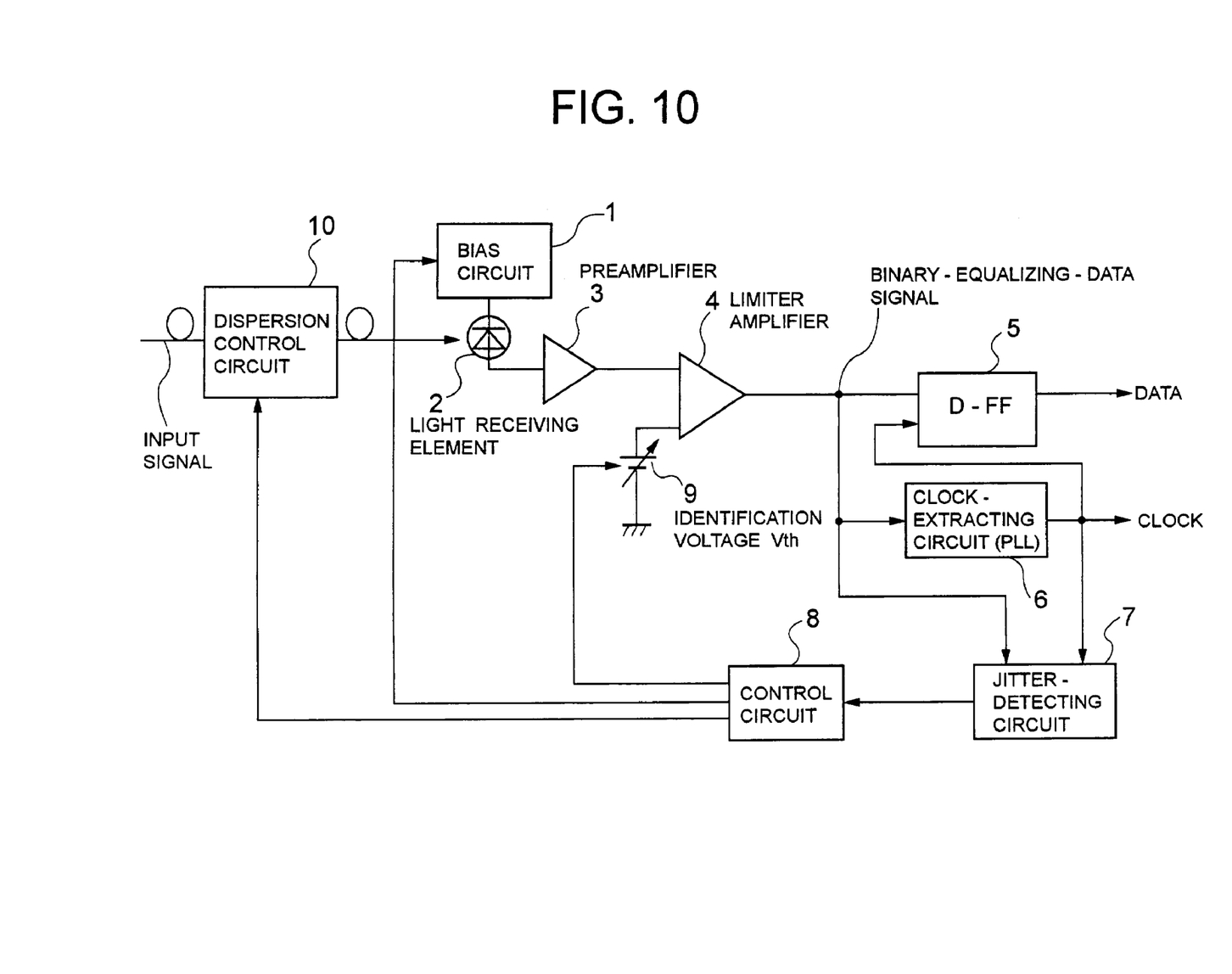
FIG. 10 is a block diagram of a third embodiment of the present invention.

Then, a third embodiment of the present invention is described below. FIG. 10 is a block diagram of the third embodiment. In FIG. 10, a component same as that in FIG. 9 is provided with the same number and its description is omitted. In FIG. 10, the third embodiment is different from the second embodiment (refer to FIG. 9) in that the control circuit 8 is constituted so as to also control a newly-provided dispersion control circuit 10 together with the identification voltage Vth 9 and bias circuit 1. In FIG. 10, the dispersion control circuit 10 is provided for the front stage of the light receiving element 2. That is, an input optical signal is input to the light receiving element 2 through the dispersion control circuit 10.

The third embodiment is an embodiment of controlling the dispersion value of the dispersion control circuit 10 so as to compensate waveform deterioration due to dispersion of an optical fiber. For the third embodiment, a case is described in which control of the identification voltage Vth 9, control of the bias circuit 1, and control of the dispersion control circuit 10 are performed together. However, it is also possible to constitute an embodiment so as to control only the dispersion control circuit 10, or the dispersion control circuit 10 and identification voltage Vth 9, or the dispersion control circuit 10 and bias circuit 1.

Figure 11:
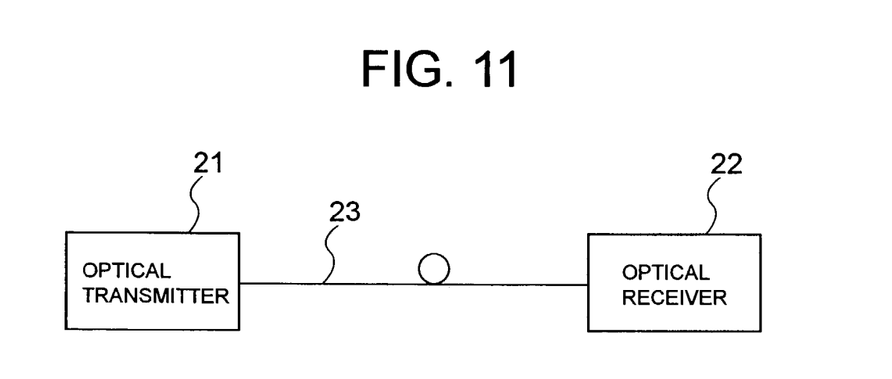
FIG. 11 is a block diagram of a fourth embodiment of the present invention.

Then, a fourth embodiment of the present invention is described below. FIG. 11 is a block diagram of the fourth embodiment. The fourth embodiment relates to a communication system constituted by an optical receiver including the optical receiving circuit according to each of the above embodiments, optical transmitter, and a transmission line for connecting the receiver with the transmitter. In FIG. 11, a communication system according to the fourth embodiment is constituted by an optical transmitter 21, optical receiver 22, and a transmission line 23 for connecting the optical transmitter 21 with the optical receiver 22.

Moreover, the optical receiver 22 includes any one of the optical receiving circuits shown in FIGS. 1, 9 and 10. According to this communication system, it is possible to make a receiving-sensitivity control parameter for deciding the receiving sensitivity of the optical receiving circuit automatically follow the optimum position because the receiving-sensitivity control parameter is controlled in accordance with the jitter value detected from the binary-equalizing-data signal obtained by binary-converting an input signal at the optical receiver 22.

Figure 12:
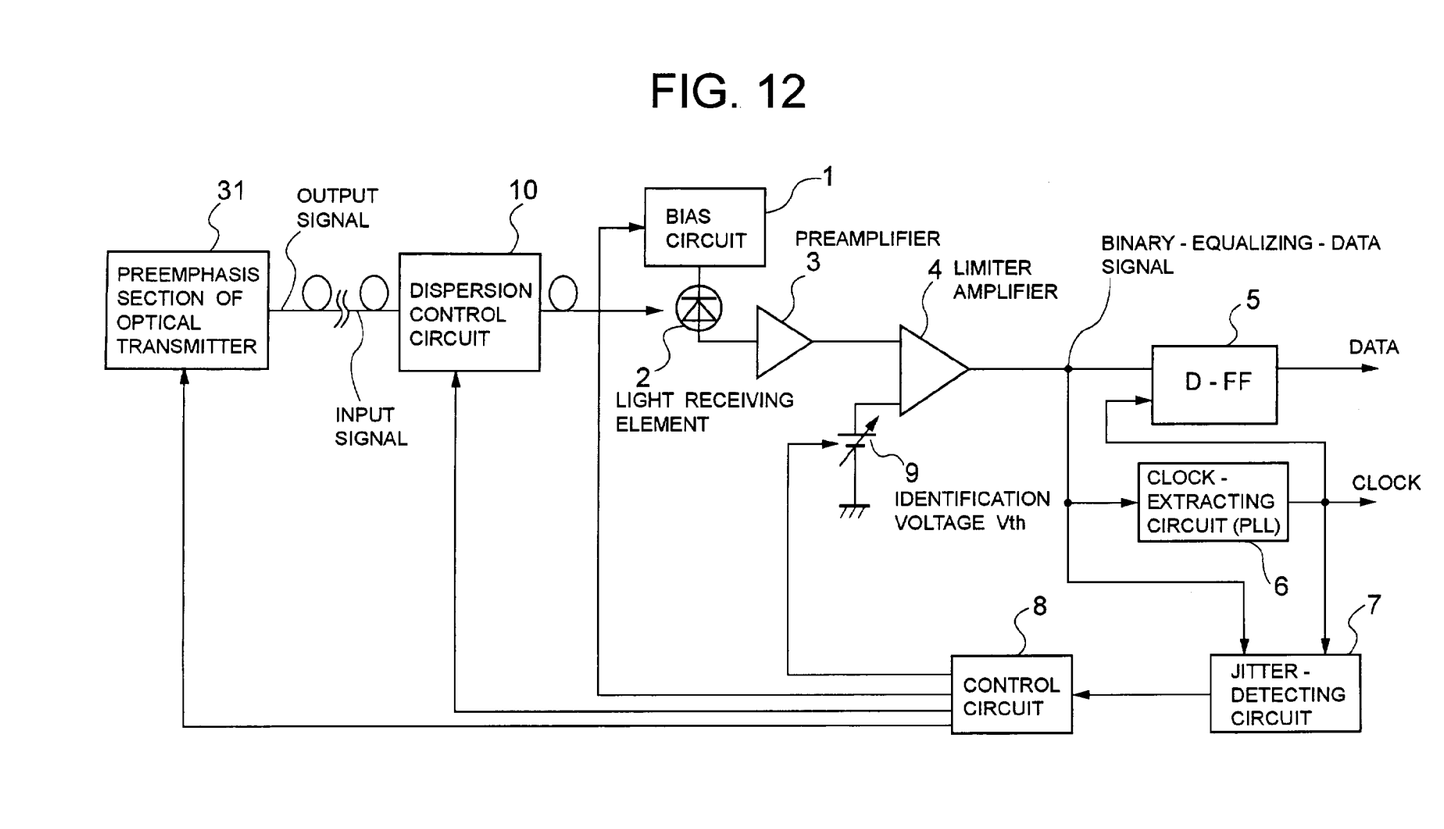
FIG. 12 is a block diagram of a fifth embodiment of the present invention.

Then, a fifth embodiment of the preesnt invention is described below. FIG. 12 is a block diagram of the fifth embodiment. In FIG. 12, a component same as that in FIG. 10 is provided with the same number and its description is omitted. The fifth embodiment is different from the third embodiment (refer to FIG. 10) in that the fifth embodiment is constituted so that when the optical transmitter 21 has a preemphasis section 31 for shaping a waveform at the transmission side, the preemphasis section 31 is controlled so as to optimize an input waveform of the optical receiver 22. In this case, the control may also be performed by using one or more in combination of the control from the identification voltage Vth 9, the control from the bias circuit 1 and the control from the dispersion control circuit 10.

In the case of the fifth embodiment, the control circuit 8 controls the preemphasis value of the preemphasis section 31 of the optical transmitter 21 so that the jitter value of an input signal (binary-equalizing-data signal) of the optical receiver 22 is minimized.

According to the present invention, because a receiving-sensitivity control parameter for deciding the receiving sensitivity of an optical receiving circuit is controlled in accordance with a jitter value detected from a binary-equalizing-data signal obtained by binary-converting an input signal, it is possible to make the receiving-sensitivity control parameter automatically follow the optimum position.

Specifically, because the receiving-sensitivity control parameter of the optical receiving circuit is controlled to the optimum position at each receiving level, it is possible to improve the receiving sensitivity and increase a transmission distance. Moreover, it is possible to prevent the bent (floor) of an error-rate characteristic caused by the fact that the receiving-sensitivity control parameter deviates from the optimum position. The floor narrows a dynamic range and in the worst case, an error-free region disappears. Furthermore, it is possible to automate an accurate adjustment of an optical receiving circuit which has been manually performed so far. Furthermore, it is possible to reduce the man-hour more than ever. Furthermore, it is possible to keep the receiving-sensitivity control parameter at the optimum position by following the fluctuation of an optical receiving environment (receiving-level fluctuation, temperature fluctuation, or power-source fluctuation). Furthermore, it is possible to comparatively easily realize the invention because a large logic circuit is not used. Therefore, it is possible to integrally set the invention in an LSI constituting the CDR (clock and data recovery circuit) of an optical receiving circuit. It is advantageous to use the invention when using it for a circuit to be operated at a high speed (speed equal to or higher than Gb/s).

What is claimed is:

1. A jitter-detecting circuit for detecting jitter from a binary-equalizing-data signal including a synchronization clock, said synchronization clock being extracted from said binary-equalizing-data signal by a clock extracting circuit that supplies the synchronization clock as an input to the jitter-detecting circuit, said jitter-detecting circuit comprising:
    phase-delaying means for delaying a phase of the synchronization clock by a predetermined value to output a phase-delayed clock;
    flip-flop means for sampling the phase-delayed clock at a leading edge or trailing edge of the binary-equalizing-data signal;
    average-value-detecting means for detecting and outputting an average value of outputs of the flip-flop means; and
    control means for controlling any one or a plurality of receiving-sensitivity control parameters in accordance with a jitter value detected from the average value,
    wherein the jitter-detecting circuit separately receives as input each of the binary-equalizing data signal and the synchronization clock extracted from the binary-equalizing data signal, wherein the phase-delaying means receives the synchronization clock as input and outputs the phase-delayed clock and wherein the flip-flop means separately receives as input each of the phase-delayed clock and the binary-equalizing data signal.

2. The jitter-detecting circuit of claim 1, wherein the binary-equalizing-data signal is obtained by converting an input signal into binary data.

3. A communication system, comprising:
    a receiver including a receiving circuit having control means for controlling any one or a plurality of receiving-sensitivity control parameters in accordance with a jitter value detected from a binary-equalizing-data signal obtained by converting an input signal into binary data, wherein said binary-equalizing-data signal includes a synchronization clock, said synchronization clock being extracted from said binary-equalizing data signal by a clock extracting circuit, and a jitter-detecting circuit that receives as input the synchronization clock from the clock-extracting circuit, wherein the jitter-detecting circuit includes a phase-delaying means for delaying a phase of the synchronization clock by a predetermined value to output a phase-delayed clock, a flip-flop means for sampling the phase-delayed clock at a leading edge or trailing edge of the binary-equalizing-data signal; and average-value-detecting means for detecting and outputting an average value of outputs of the flip-flop means, wherein the receiving circuit separately receives as input each of the binary-equalizing data signal and the synchronization clock extracted from the binary-equalizing data signal, wherein the phase-delaying means receives the synchronization clock as input and outputs the phase-delayed clock, and wherein the flip-flop means separately receives as input each of the phase-delayed clock and the binary-equalizing data signal;
    a transmitter opposite to the receiver; and
    a transmission line for connecting the receiver with the transmitter.

4. The receiving circuit according to claim 2, wherein the control means performs control so that the jitter value of the binary-equalizing-data signal is minimized.

5. The jitter-detecting circuit according to claim 1, wherein the phase-delaying means delays the phase of the synchronization clock by 90° when a data edge of the binary-equalizing-data signal coincides with the fall of the synchronization clock.

6. The jitter-detecting circuit according to claim 1, wherein characteristic-converting means is included which converts an output of the average-value-detecting means so that the output can be easily controlled by a rear-stage circuit.

7. The receiving circuit according to claim 2, wherein the receiving-sensitivity control parameters are an identification voltage and identification phase serving as the criterion of binary identification of the input signal.

8. The receiving circuit according to claim 2, wherein one of the receiving-sensitivity control parameters is a multiplication factor of a light receiving element for converting an input optical signal into an electrical signal.

9. The receiving circuit according to claim 2, wherein one of the receiving-sensitivity control parameters is a dispersion compensation value of a dispersion control circuit set to the front stage of a light receiving element for converting an input optical signal into an electrical signal.

10. The receiving circuit according to claim 2, wherein one of the receiving-sensitivity control parameters is a preemphasis value of an output signal of a transmitter.

11. A jitter-detecting circuit for detecting jitter from a binary-equalizing-data signal including a synchronization clock, said synchronization clock being extracted from said binary-equalizing-data signal by a clock extracting circuit that supplies the synchronization clock as an input to the jitter-detecting circuit, said jitter-detecting circuit comprising:
    a delay circuit for delaying a phase of the synchronization clock by a predetermined value to output a phase-delayed clock;
    a flip-flop for sampling the phase-delayed clock at a leading edge or trailing edge of the binary-equalizing-data signal;
    an average-value-detecting circuit for detecting and outputting an average value of outputs of the flip-flop; and
    a control circuit for controlling any one or a plurality of receiving-sensitivity control parameters in accordance with a jitter value detected from the average value,
    wherein the jitter-detecting circuit separately receives as input each of the binary-equalizing data signal and the synchronization clock extracted from the binary-equalizing data signal, wherein the delay circuit receives the synchronization clock as input and outputs the phase-delayed clock, and wherein the flip-flop separately receives as input each of the phase-delayed clock and the binary-equalizing data signal.

12. The jitter-detecting circuit according to claim 11, wherein the delay circuit delays the phase of the synchronization clock by 90° when a data edge of the binary-equalizing-data signal coincides with the fall of the synchronization clock.

13. The jitter-detecting circuit according to claim 11, wherein a characteristic-converting circuit is included which converts an output of the average-value-detecting circuit so that the output can be easily controlled by a rear-stage circuit.

14. A receiving circuit, comprising:
a light receiving element for converting an optical signal into an electrical signal;
a bias circuit for supplying a predetermined bias voltage to the light receiving element;
a preamplifier for amplifying the electrical signal supplied from the light receiving element;
a limiter amplifier for binary-identifying the electrical signal supplied from the preamplifier by using an identification voltage and outputting a binary-equalizing-data signal;
a clock extracting circuit that extracts a synchronization clock from an output of the limiter amplifier;
a jitter-detecting circuit that receives as input the synchronization clock from the clock extracting circuit, wherein the jitter-detecting circuit detects jitter by using binary-equalizing-data signal and the synchronization clock, each of the binary-equalizing-data signal and the synchronization clock being separately supplied to the jitter-detecting circuit, wherein the jitter-detecting circuit includes a delay circuit for delaying a phase of the synchronization clock by a predetermined value to output a phase-delayed clock, a flip-flop for sampling the phase-delayed clock at a leading edge or trailing edge of the binary-equalizing-data signal, an average-value-detecting circuit for detecting and outputting an average value of outputs of the flip-flop, and a control circuit for controlling the identification voltage in accordance with the average value so that an output of the jitter-detecting circuit is minimized, wherein the delay circuit receives the synchronization clock as input and outputs the phase-delayed clock, and wherein the flip-flop separately receives as input each of the phase-delayed clock and the binary-equalizing data signal.

15. The receiving circuit according to claim 14, wherein the control circuit controls the multiplication factor of the light receiving element together with the identification voltage by controlling the bias circuit.

16. The receiving circuit according to claim 14, wherein a dispersion control circuit is set to the front stage of the light receiving element and the control circuit controls the dispersion control circuit together with the identification voltage.

17. The receiving circuit according to claim 14, wherein the control circuit controls a preemphasis section of an optical transmitter for transmitting the optical signal together with the identification voltage.

* * * * *